US009298654B2

(12) United States Patent
Fleischer et al.

(10) Patent No.: US 9,298,654 B2
(45) Date of Patent: Mar. 29, 2016

(54) LOCAL BYPASS IN MEMORY COMPUTING

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US); Martin Ohmacht, Yorktown Heights, NY (US); Krishnan Sugavanam, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 488 days.

(21) Appl. No.: 13/837,909

(22) Filed: Mar. 15, 2013

(65) Prior Publication Data

US 2014/0281084 A1 Sep. 18, 2014

(51) Int. Cl.
*G06F 13/36* (2006.01)
*G06F 13/00* (2006.01)
*G06F 13/28* (2006.01)
*G06F 13/364* (2006.01)

(52) U.S. Cl.
CPC .............. *G06F 13/364* (2013.01); *G06F 13/28* (2013.01)

(58) Field of Classification Search
CPC ... G06F 12/802; G06F 3/061; G06F 13/1642; G06F 13/16; G06F 13/1605; G06F 13/14
USPC ........... 710/113, 310; 711/100, 138, 151, 158
See application file for complete search history.

(56) References Cited

U.S. PATENT DOCUMENTS

| 6,415,369 | B1 | 7/2002 | Chodnekar et al. |
| 7,039,770 | B1 | 5/2006 | Chen et al. |
| 7,376,803 | B1 * | 5/2008 | Eckert ................. G06F 13/1626 711/105 |
| 8,930,641 | B1 | 1/2015 | Kapasi et al. |
| 2004/0034753 | A1 | 2/2004 | Jeddeloh |
| 2007/0158808 | A1 | 7/2007 | Bruce et al. |
| 2008/0031269 | A1 * | 2/2008 | Shimizu ............... H04L 12/5693 370/412 |
| 2009/0037664 | A1 | 2/2009 | Kornegay et al. |
| 2010/0318750 | A1 * | 12/2010 | Eckert ..................... G06F 13/16 711/151 |
| 2011/0087895 | A1 | 4/2011 | Olson et al. |
| 2013/0007386 | A1 | 1/2013 | Wolf et al. |

(Continued)

OTHER PUBLICATIONS

U.S. Appl. No. 13/966,441; Non-Final Office Action; filed Aug. 14, 2013; Date Mailed: Mar. 6, 2015; 8 pages.

*Primary Examiner* — Faisal M Zaman
(74) *Attorney, Agent, or Firm* — Cantor Colburn LLP (57) ABSTRACT

Embodiments include a method for bypassing data in an active memory device. The method includes a requestor determining a number of transfers to a grantor that have not been communicated to the grantor, requesting to the interconnect network that the bypass path be used for the transfers based on the number of transfers meeting a threshold and communicating the transfers via the bypass path to the grantor based on the request, the interconnect network granting control of the grantor in response to the request. The method also includes the interconnect network requesting control of the grantor based on an event and communicating delayed transfers via the interconnect network from other requestors, the delayed transfers being delayed due to the grantor being previously controlled by the requestor, the communicating based on the control of the grantor being changed back to the interconnect network.

13 Claims, 7 Drawing Sheets

(56) References Cited

U.S. PATENT DOCUMENTS

| | | | |
|---|---|---|---|
| 2013/0297906 A1* | 11/2013 | Loh | G06F 13/1642 711/167 |
| 2014/0089584 A1* | 3/2014 | Pan | G06F 12/08 711/118 |
| 2014/0201471 A1 | 7/2014 | Cutter et al. | |
| 2014/0240326 A1* | 8/2014 | Cutter | G06F 9/00 345/502 |
| 2014/0281100 A1* | 9/2014 | Fleischer | G06F 13/28 710/308 |

* cited by examiner

LOCAL BYPASS IN MEMORY COMPUTING

BACKGROUND

The present invention relates generally to computer processing and memory, and more particularly to bypass communication paths for in memory computing.

Computer systems often require a considerable amount of high speed memory, such as random access memory (RAM), to hold information (e.g., data and programs) when a computer is powered and operational. Memory device demands have continued to grow as computer systems have increased in performance and complexity. As devices increase in complexity, managing power used by processing units, such as cores, is an important factor in overall computing performance.

For systems having distributed processing, the network structure that connects the processors to the memory banks grows as the number of processors grow. This can results in a significant power increase in moving data between the memory and processors.

SUMMARY

Embodiments include a system, computer program product and method for bypassing data in an active memory device including an interconnect network, a memory vault, a processing element and a bypass path between the memory vault and the processing element that bypasses the interconnect network. The method includes a requestor determining a number of transfers to a grantor that have not been communicated to the grantor, requesting to the interconnect network that the bypass path be used for the transfers based on the number of transfers meeting a threshold and communicating the transfers via the bypass path to the grantor based on the request, the interconnect network granting control of the grantor in response to the request. The method also includes the interconnect network requesting control of the grantor based on an event and communicating delayed transfers via the interconnect network from other requestors, the delayed transfers being delayed due to the grantor being previously controlled by the requestor, the communicating based on the control of the grantor being changed back to the interconnect network, the requestor being one of the processing element and the memory vault and the grantor being the other one of the processing element and the memory vault.

DETAILED DESCRIPTION

An embodiment is directed to improve communication paths for a computer system having in-memory processing or computing, such as a computer system with one or more active memory devices. The communication paths may be bypass paths that allow an in-memory processing element to access one or more local memory bank groups without having to traverse a main interconnect network, thus reducing latency and power consumption. The active memory device may be any suitable memory device including one or more memory device (e.g., random access memory "RAM" chips) connected to one or more hub chips (also referred to as a memory controller chips) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of vaults are located on a memory module, where each vault has a respective hub chip placed beneath the memory vault. The hub chips may each include a memory controller and one or more processing elements ("PEs"). The processing element is configured to communicate with the memory vaults and other processing elements in other hub chips. In an embodiment, a processing element accesses a selected address in a vault through an interconnect network. In one embodiment, a plurality of memory devices, vaults and processing elements may communicate via the interconnect network, including one or more crossbar switch.

In an embodiment, memory chips, such as active memory devices with many Processing Elements (PE) and Memory Controllers and Vaults (MCV), the latency and power of the interconnect (also referred to as "interconnect network") can become significant. To reduce latency and power, local paths that bypass the global interconnect can be provided. A local bypass path may associate a subset of PEs with a subset of MCVs such that accesses from a PE in a subset can use a local interconnect path to any of the MCVs in the subset. If memory requests from local PEs often go to the corresponding MCVs then latency and power in the interconnect can be reduced. Further, the global interconnect for the system could potentially be sized down to save area and power. Similarly, a subset of links from an external main processor chip can be associated with a subset of MCVs and can save latency and power by not having to go through the global interconnect if the processor chip cores using that subset of links often access only the corresponding MCV subset of the memory space.

Embodiments exploiting this technique have data stored at specific memory locations so that data is localized to a subset of MCVs. Localized bypass paths pose a challenge in the context of yield spares, where some PEs or MCVs can be inoperative in which case it is desirable to be able to shift the bypass to be used by another neighboring PE such that all PEs have a local bypass. In embodiments, a PE may therefore have at least bypasses to two or more neighboring MCVs such that if a subset of PEs are determined faulty after manufacturing, other PEs can shift their bypass paths to use the MCVs that would normally have corresponded to those faulty PEs depending on physical location on the chip such that all bypasses can stay local. In an embodiment of a 3D memory cube, neighboring memory vaults to a PE may include vaults that are directly above the PE as well as vaults that are directly above PEs that are adjacent the PE. Similarly, neighboring PEs to a memory vault may include PEs that are directly below the vault as well as PEs that are directly below the vaults that are adjacent the vault. It should be understood that the PEs and vaults may be placed in any suitable location, including above or below one another, depending on system needs, where bypass paths may connect neighboring PEs and vaults regardless of their placement.

The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

Figure 1:
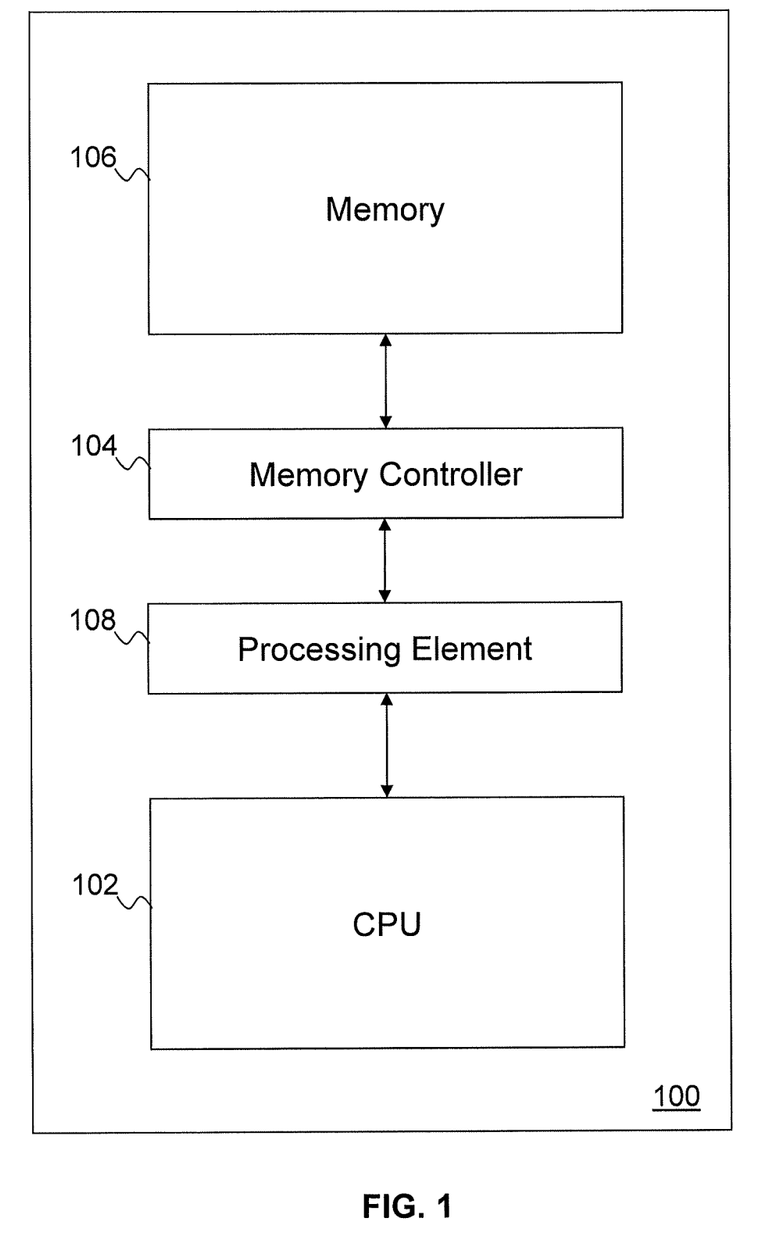
FIG. 1 illustrates a block diagram of a system for active memory in accordance with an embodiment.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
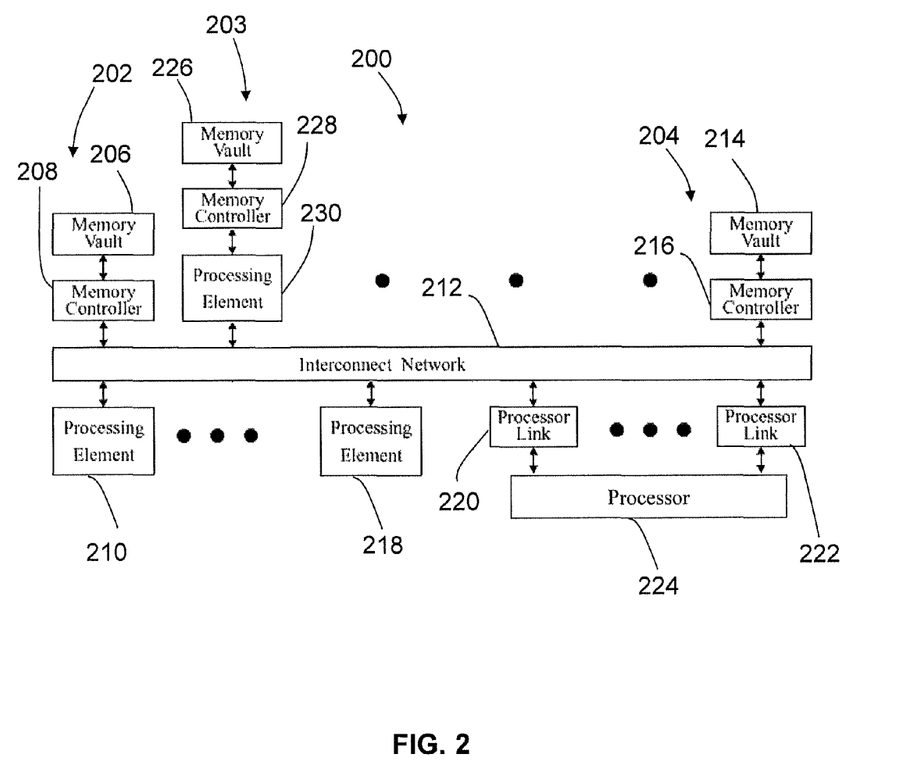
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
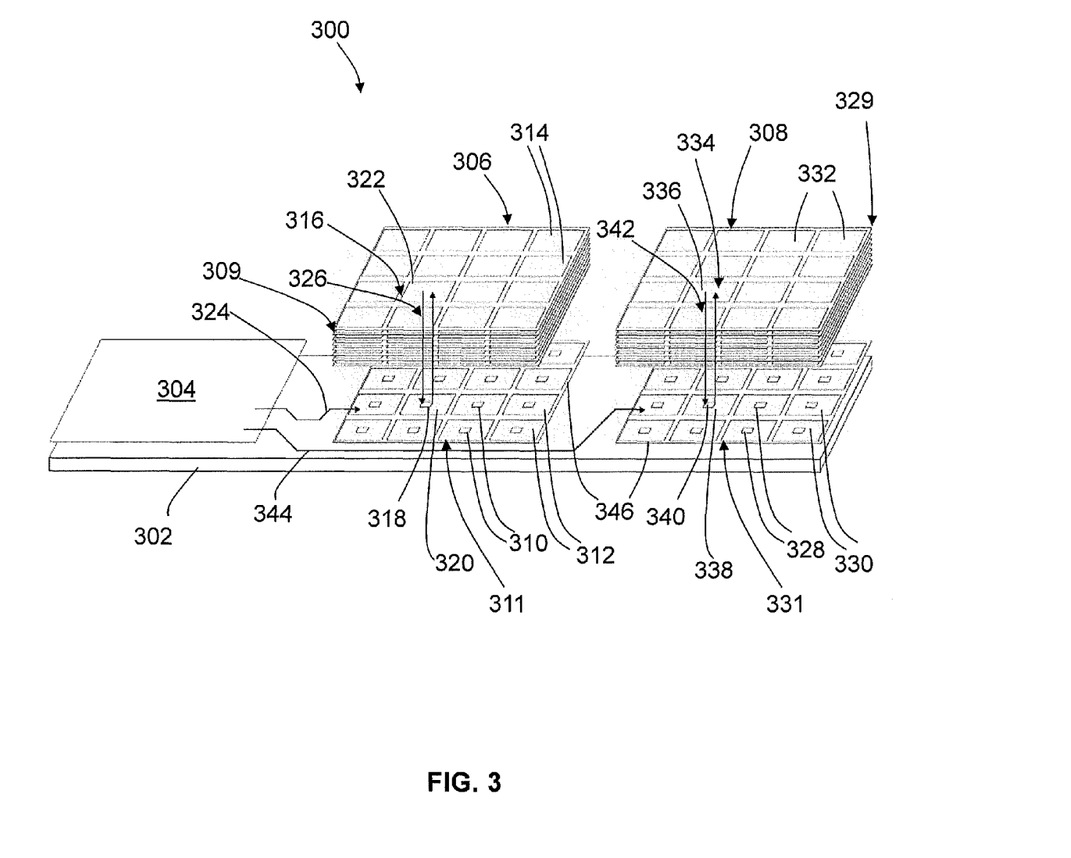
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
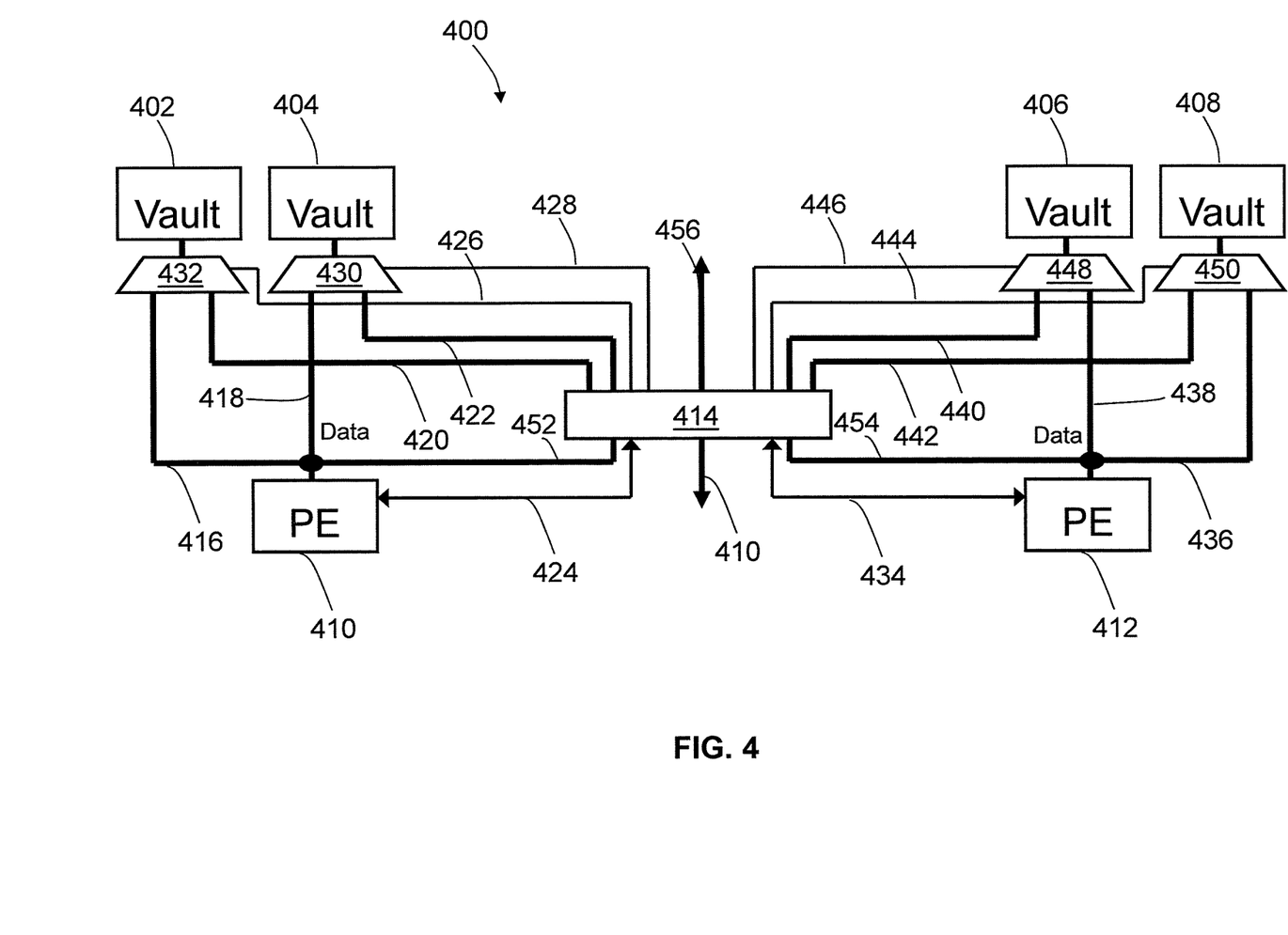
FIG. 4 illustrates a block diagram of portion of an in memory computing system having bypass paths in accordance with an embodiment.

FIG. 4 depicts a portion of an exemplary memory system 400 having a local bypass for in memory computing. The memory system 400 is an embodiment of at least a portion of the systems shown in FIGS. 1-3. The memory system 400 includes memory vaults 402, 404, 406 and 408 coupled to processing elements (PEs) 410 and 412. An interconnect 414 allows communication between the vaults 402, 404, 406 and 408 and PEs 410 and 412. In embodiments, the interconnect 414 includes a plurality of crossbar switches and a controller to organize and control traffic through the interconnect. The interconnect 414 (also referred to as "interconnect network") communicates with other interconnects of the memory system 400 via links 410 and 456. The PEs 410, 412 may communicate with vaults 402, 404, 406 and 408 via the interconnect 414 or via bypass paths 416, 418, 436 and 438. Communication between the PE 412 and vaults 406, 408 occurs through interconnect 414, interconnect links 454, 440 and 442. Similarly, communication between the PE 410 and vaults 402, 404 occurs through interconnect 414, interconnect links 452, 420 and 422. In an embodiment, the PEs may communicate via bypass paths when a number of pending transfers to a specific vault meet a threshold value. In one embodiment with a threshold value of 32, if the number of pending transfers from PE 410 to vault 404 is 32 or greater, then the transfers will use bypass path 418 to communicate the pending transfers. The transfers may be commands, such as loads, stores or arithmetic operations supported by the MCVs on memory addresses specified by the commands. The commands may contain a payload to transfer data to and from memory.

In an embodiment, the transfers to the vaults 402, 404, 406 and 408 may be communicated through respective multiplexers ("muxes") 432, 430, 448 and 450. Bypass select links 426 and 428 control the inputs received by vaults 402 and 404 via multiplexers 432 and 430, respectively. Bypass select links 446 and 444 control the inputs received by vaults 406 and 408 via multiplexers 448 and 450, respectively. The interconnect 414 may control the multiplexers via the links 426, 428, 444, 446 where a controller in the interconnect grants control of one of the vaults 402, 404, 406, 408 to a requesting PE based on a criteria being met for local communication. In embodiments, when a number of pending transfers meets a threshold, the PEs 410, 412 request, via links 424, 434, respectively, control of the vault that is the target of the pending transfers (i.e., the vault having addresses specified by the transfers). In an embodiment of FIG. 4, the PEs 410, 412 are referred to as requestors and the "target" memory vaults 402, 404, 406, 408 are referred to as grantors. When the pending transfers from a requestor to a grantor meet the threshold, the requestor PE requests control of the grantor vault from the interconnect 414. In an embodiment, the number of pending transfers is determined by counting the transfers in a pending transfers queue. In another embodiment, the number of pending transfers is determined by determining the number of instructions in a stream of instructions that target the grantor vault from a load-store unit (LSU). For example, in a PE that is executing vector code, the number of instructions that will target a vault is easily identified in the LSU through an iteration count of the vector and an address stride of load-update or store-update instructions. Once the interconnect has granted control of the grantor vault to the requestor PE, the PE communicates the pending transfers via the local bypass path or link directly to the grantor vault. While the requestor PE has control of the grantor vault, the interconnect 414 may accumulate transfers that are from other PEs to the grantor vault, where the transfers are delayed until the interconnect 414 has control of the grantor vault. In embodiments, when a selected event or condition is met, the interconnect requests control of the grantor vault from the requestor PE. The event includes but is not limited to: when the number of delayed requests for transfers or transfers accumulated by the interconnect 414 meet a second threshold, when the number of clock cycles a request for transfer or transfer to the interconnect 414 has been pending meets a third threshold, when a number of clock cycles the bypass has been idle meets a fourth threshold, when an indication is provided that the requestor has completed communications to the grantor or any combination of these conditions occur. After the requestor PE grants control of the grantor vault back to the interconnect 414, the delayed transfers are communicated to the grantor vault. In another embodiment, the interconnect 414 requests control of the grantor vault from the requestor PE based on the requestor completing communication of the pending transfers to the grantor vault.

When control of the grantor vault is granted by the interconnect 414 to the requestor PE, pending requests for transfers to the grantor vault at the interconnect may be removed to ensure that transfers are not duplicated and that load and store transfers to the same address are transferred in order. In an embodiment, the bypass paths 416, 418, 436, 438 may use shared ports on the PEs 410, 412, where the ports are also used by interconnect links 452, 454. In another embodiment, the PEs 410, 412 each have dedicated ports for communication via the bypass paths 416, 418, 436, 438. In embodiments, the pending transfers are communicated via the bypass path thus avoiding the delays of the interconnect muxes in block 414 and wire delays of long interconnect links 420, 422, 452, 440, 442, 454. Furthermore the bypass mux select 426, 428, 444, 446 does not switch while the bypass is active.

Figure 5:
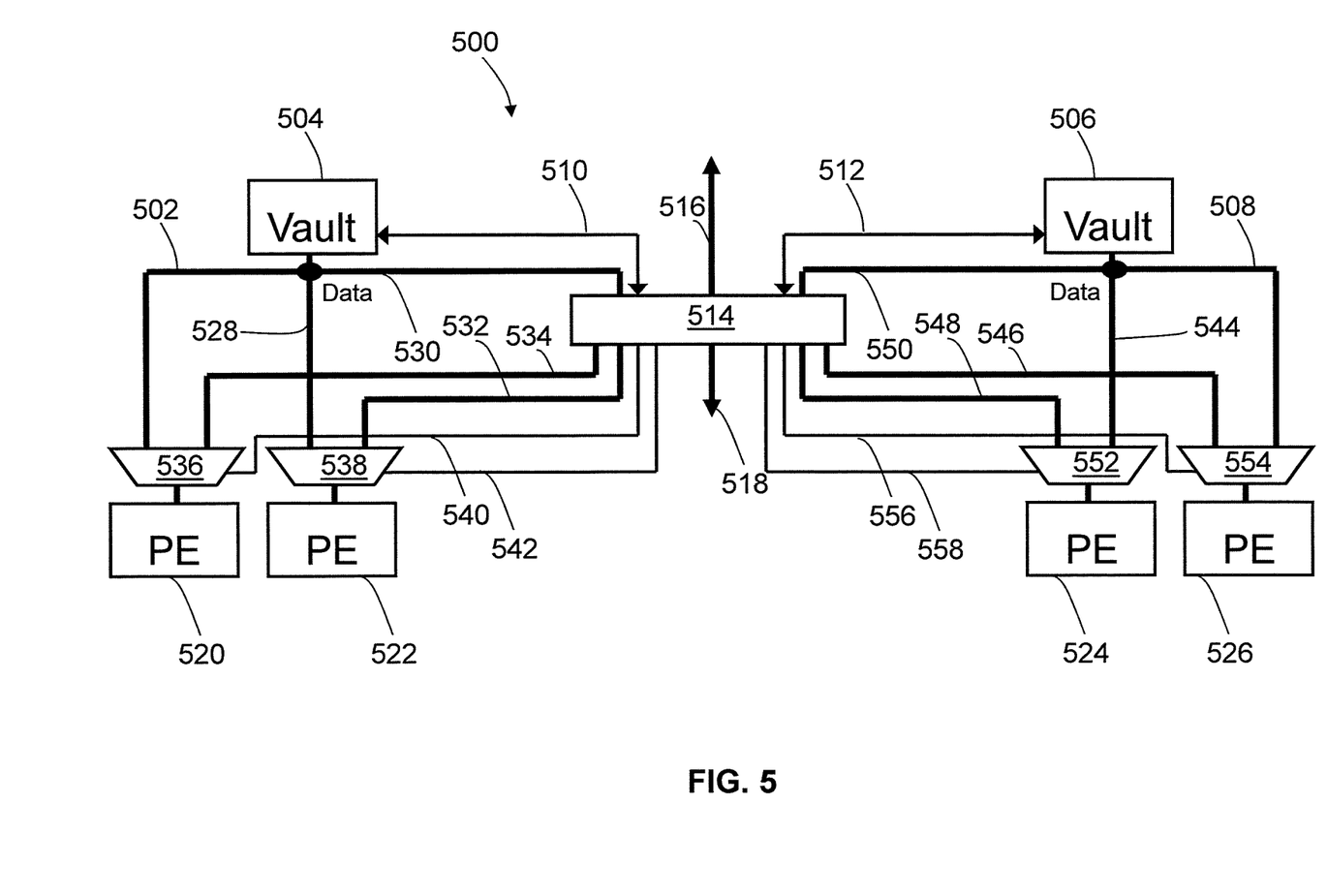
FIG. 5 illustrates a block diagram of portion of an in memory computing system having bypass paths in accordance with an embodiment.

FIG. 5 depicts a portion of an exemplary memory system 500 having a local bypass for in memory computing. The memory system 500 is an embodiment of at least a portion of the systems shown in FIGS. 1-3. The memory system 500 includes memory vaults 504 and 506 coupled to processing elements (PEs) 520, 522, 524 and 526. An interconnect 514 allows communication between the vaults 504 and 506 and PEs 520, 522, 524 and 526. In embodiments, the interconnect 514 includes a plurality of crossbar switches and a controller to organize and control traffic through the interconnect. The interconnect 514 communicates with other interconnects of the memory system 500 via links 516 and 518. The PEs 520, 522, 524 and 526 may communicate with vaults 504 and 506 via the interconnect 514 or via bypass paths 502, 528, 508 and 544. Communication between the vault 504 and PEs 520, 522 occurs through interconnect 514, interconnect links 530, 532 and 534. Similarly, communication between the vault 506 and PEs 524, 526 occurs through interconnect 514, interconnect links 550, 546 and 548. In an embodiment, the vaults may communicate via bypass paths when a number of pending transfers to a specific PE meet a threshold value. In one embodiment with a threshold value of 32, if the number of pending transfers from vault 504 to PE 522 is 32 or greater, then the transfers will use bypass path 528 to communicate the pending transfers. The transfers may be commands that specify the transfer of data to or from a PE. The commands may contain a payload to transfer data to and from the PEs.

In an embodiment, the transfers to the PEs 520, 522, 524 and 526 may be communicated through respective multiplexers 536, 538, 552 and 554. Bypass select links 540 and 542 control the inputs received by PEs 520 and 522 via multiplexers 536 and 538, respectively. Bypass select links 556 and 558 control the inputs received by PEs 526 and 524 via multiplexers 554 and 552, respectively. The interconnect 514 may control the multiplexers via the links 540, 542, 556, 558 where a controller in the interconnect grants control of one of the PEs 520, 522, 524, 526 to a requesting vault based on a criteria being met for local communication. In embodiments, when a number of pending transfers meets a threshold, the vaults 504, 506 request, via links 510, 512, respectively, control of the PE that is the target of the pending transfers (i.e., the PE having addresses specified by the transfers). In an embodiment of FIG. 5, the memory vaults 504, 506 are referred to as requestors and the "target" PEs 520, 522, 524, 526 are referred to as grantors. When the pending transfers from a requestor to a grantor meet the threshold, the requestor vault requests control of the grantor PE from the interconnect 514. In an embodiment, the number of pending transfers is determined by counting the transfers in a pending transfers queue. In another embodiment, the requestor vault requests control of the grantor PE based on hints provided by the PE, the PE generating the hint based on the number of load or store transfers it has made, or will make, to the vault. In an embodiment the hint is passed along with a load or store transfer that the PE makes to the vault.

Once the interconnect has granted control of the grantor PE to the requestor vault, the vault communicates the pending transfers via the local bypass path or link directly to the grantor PE. While the requestor vault has control of the grantor PE, the interconnect 514 may accumulate transfers that are from other vaults to the grantor PE, where the transfers are delayed until the interconnect 514 has control of the grantor PE. In an embodiment, when a selected event or condition is met, the interconnect requests control of the grantor vault from the requestor PE. The selected event includes but is not limited to: when the number of delayed requests for transfers or transfers accumulated by the interconnect 514 meets a second threshold, when the number of clock cycles a request for transfer or transfer to the interconnect 414 has been pending meets a third threshold, when a number of clock cycles the bypass has been idle meets a fourth threshold, when an indication is provided that the requestor has completed communications to the grantor or any combination of these conditions occur. After the requestor vault grants control of the grantor PE back to the interconnect 514, the delayed transfers are communicated to the grantor PE. In another embodiment, the interconnect 514 requests control of the grantor PE from the requestor vault based on the requestor completing communication of the pending transfers to the grantor PE.

When control of the grantor PE is granted by the interconnect 514 to the requestor vault, pending requests for transfers for the grantor PE at the interconnect may be removed to ensure that transfers are not duplicated and that load transfers from the same address are transferred in order. In an embodiment, the bypass paths 502, 528, 544, 508 may use shared ports on the vaults 504, 506, where the ports are also used by interconnect links 530, 550. In another embodiment, the vaults 504, 506 each have dedicated ports for communication via the bypass paths 502, 528, 544, 508. In embodiments, the pending transfers are communicated via the bypass path thus avoiding the delays of the interconnect muxes in block 514 and wire delays of long interconnect links 532, 534, 530, 546, 548, 550. Furthermore the bypass mux select 540, 542, 556, 558 does not switch while the bypass is active.

Figure 6:
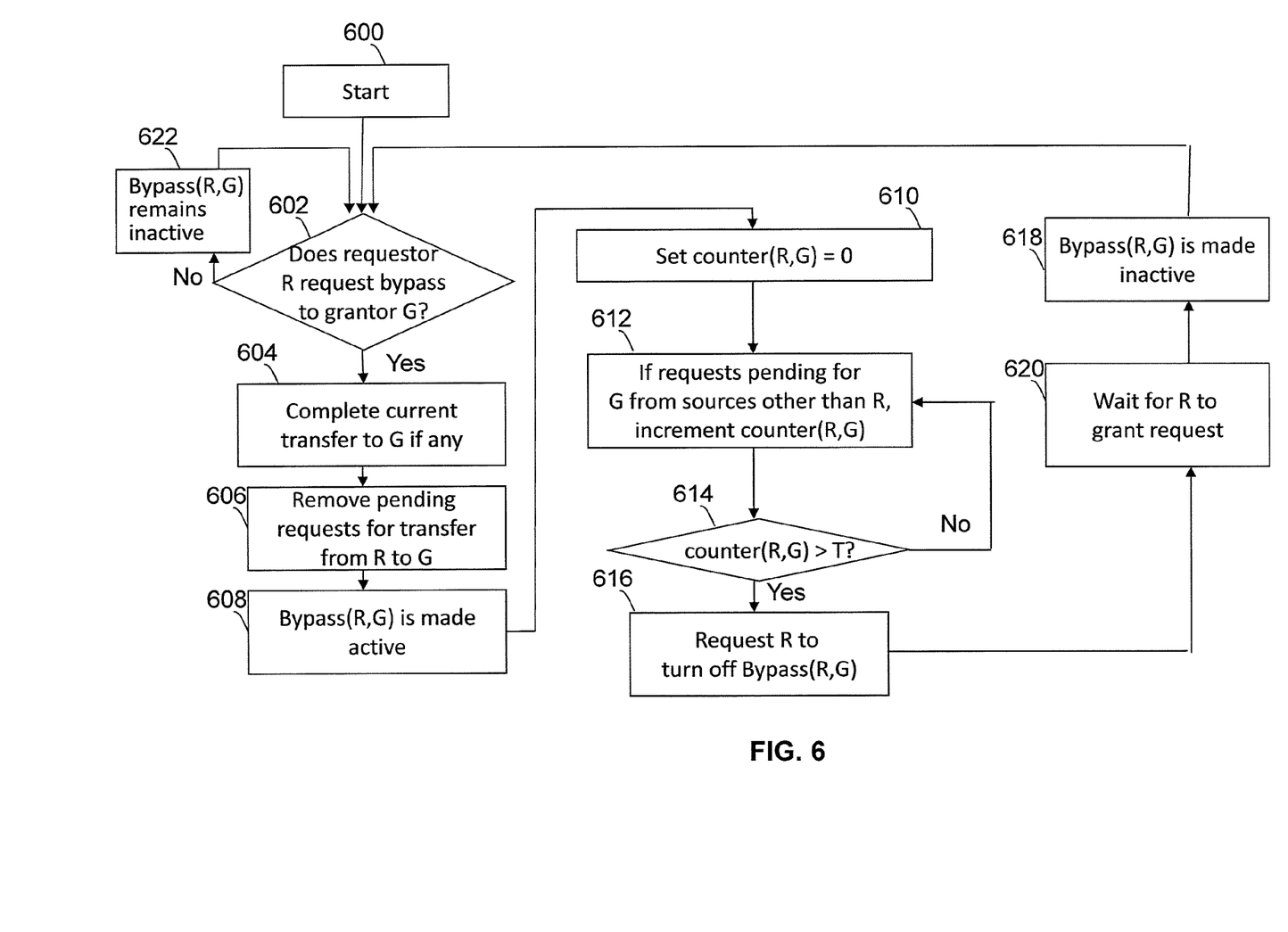
FIG. 6 depicts a portion of a flowchart for the transfer of control of a grantor from an interconnect network to a requestor as seen from the perspective of the interconnect network in accordance with an embodiment.

FIG. 6 depicts a portion of an exemplary flowchart for the transfer of control of a grantor (402, 404, 406, 408, or 520, 522, 524, 526) from the interconnect network (414 or 514) to a requestor (one of 410, 412 or 504, 506) as seen from the perspective of the interconnect network. The sequence for transfer of control starts in block 600. As long as there is no requestor "R" requesting bypass to a grantor "G," the bypass between requestor R and grantor G remains inactive in block 622. In block 602, if a requestor R requesting bypass to a grantor G, the interconnect network first completes any currently ongoing transfers to grantor G in block 604, removes any pending requests for transfers from requestor R to grantor G in block 606, and activates the bypass between R and grantor G, such as "bypass(R,G)", by setting the mux select (426, 428, 444, 446 or 540, 542, 556, 558) for the corresponding bypass mux (430, 432, 448, 450 or 536, 538, 552, 554) of the bypass path (416, 418, 436, 438 or 502, 528, 508, 544) accordingly. In embodiments, the requestor communicates the transfers via the bypass path to the grantor without causing a mux select to be switched. In an embodiment, a counter, such as "counter(R,G)", is set to 0 in block 610. In block 612, the counter(R,G) is incremented if there is a request for a transfer to grantor G pending from a requestor other than requestor R. In block 614, the value of the counter(R,G) is checked against a threshold T. If the value of counter(R,G) is not larger than the value of threshold T, the control sequence returns to block 612. If the value of the counter(R,G) the interconnect network requests requestor R to turn off the bypass between R and grantor G (bypass(R,G). In block 620, the interconnect network waits for requestor R to grant the request. Once the request is granted bypass(R,G) is made inactive in block 618 and the control sequence returns to block 602.

Figure 7:
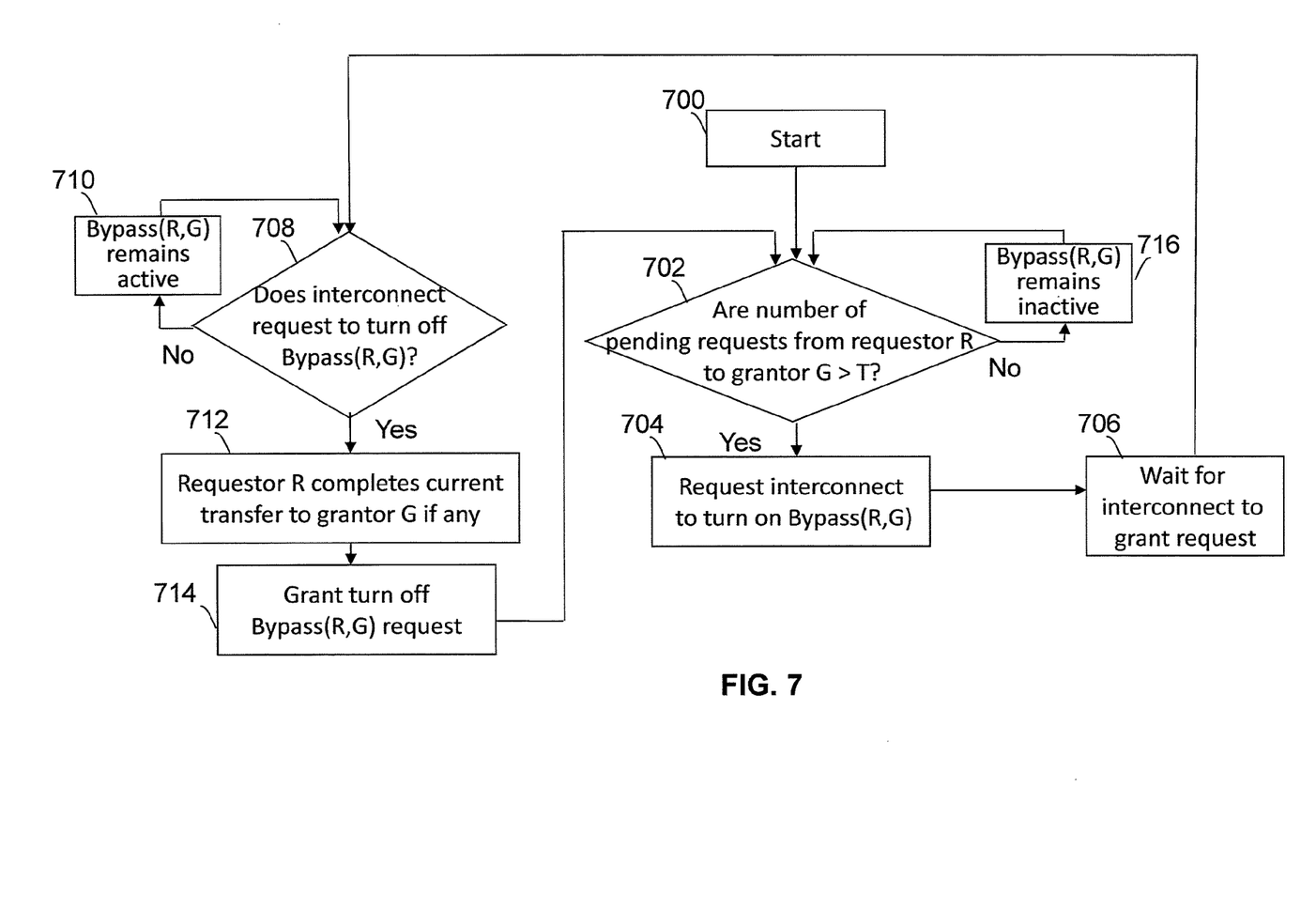
FIG. 7 depicts a portion of a flowchart for the transfer of control of a grantor from the interconnect network to a requestor as seen from the perspective of the requestor in accordance with an embodiment.

FIG. 7 depicts a portion of an exemplary flowchart for the transfer of control of a grantor (402, 404, 406, 408, or 520, 522, 524, 526) from the interconnect network (414 or 514) to a requestor (410, 412 or 504, 506) as seen from the perspective of the requestor. For a PE to vault bypass, the PE is the requestor and the vault is the grantor. For a vault to PE bypass, the vault is the requestor and the PE is the grantor. The control sequence for transfer of control starts in block 700. In an embodiment, if the number of pending requests in a pending queue of requestor R destined for grantor G is not larger than a threshold T in block 702 then the bypass, such as "bypass (R,G)", between the requestor R and grantor G remains inactive in block 716. If the number is greater than the threshold T, a request is sent by the requestor R to the interconnect network to turn on bypass(R,G) in block 704. The requestor R waits for the interconnect network to grant the request in block 706. Once the bypass has been activated by the interconnect network, the requestor R checks in block 708 whether the interconnect network has made a request to turn off bypass(R,G). If the interconnect has not made the request, the bypass(R,G) remains active in block 710, otherwise the requestor R completes the current transfer to grantor G if any in block 712 and then grants the interconnect network to turn off bypass(R,G) and the control sequence returns to block 702.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for communication in a computer system, the computer system comprising:
   an active memory device including a memory vault, a processing element, an interconnect network configured to connect the memory vault and the processing element, the interconnect network including a first physical link, and a bypass path configured to connect the memory vault and the processing element, the bypass path including a second physical link that is different than the first physical link, the system configured to perform a method comprising:
   determining, by a requestor, a number of transfers from the requestor to a grantor that have not been communicated to the grantor;
   requesting, by the requestor, to the interconnect network that the bypass path be used for the transfers based on the number of transfers meeting a threshold;
   granting control of the grantor to the requestor in response to the requesting by the requestor;
   based on granting control of the grantor to the requestor, communicating the transfers via the bypass path to the grantor;
   requesting, by the interconnect network, control of the grantor based on an event; and
   communicating delayed transfers via the interconnect network from other requestors, the delayed transfers being delayed due to the grantor being previously controlled by the requestor, the communicating based on the control of the grantor being changed back to the interconnect network,
   the requestor comprising one of the processing element and the memory vault and the grantor comprising the other one of the processing element and the memory vault.

2. The system of claim 1, wherein determining the number of transfers to the grantor further comprises determining the number of pending transfers in a pending queue of the requestor.

3. The system of claim 1, wherein determining the number of transfers to the grantor further comprises determining a number of instructions targeting the grantor by a load-store unit.

4. The system of claim 1, wherein requesting control of the grantor based on the event further comprises requesting control of the grantor based on one or more of: a number of delayed transfers to the grantor meeting a second threshold, a number of clock cycles a delayed transfer has been delayed meeting a third threshold, a number of clock cycles the bypass path has been idle meeting a fourth threshold, and an indication that the requestor has completed communications to the grantor.

5. The system of claim 1, wherein communicating the transfers via the bypass path to the grantor further comprises communicating the transfers via the bypass path without causing a mux select to be switched.

6. The system of claim 1, wherein the memory vault and processing element are positioned directly on top of each other on a module.

7. The system of claim 1, wherein the memory vault and processing element are adjacent each other on a module.

8. A computer program product for communication in an active memory device including an interconnect network, a memory vault, a processing element and a bypass path between the memory vault and the processing element that bypasses the interconnect network, the computer program product comprising:
   a non-transitory storage medium readable by a processing circuit and storing instructions for execution by the processing circuit for performing a method comprising:
   determining, by a requestor, a number of transfers from the requestor to a grantor that have not been communicated to the grantor;
   requesting, by the requestor, to the interconnect network that the bypass path be used for the transfers based on the number of transfers meeting a threshold;

granting control of the grantor to the requestor in response to the requesting by the requestor;

based on granting control of the grantor to the requestor communicating the transfers via the bypass path to the grantor;

requesting, by the interconnect network, control of the grantor based on an event; and communicating delayed transfers via the interconnect network from other requestors, the delayed transfers being delayed due to the grantor being previously controlled by the requestor, the communicating based on the control of the grantor being changed back to the interconnect network, the requestor comprising one of the processing element and the memory vault and the grantor comprising the other one of the processing element and the memory vault;

wherein the bypass path uses a first physical link between the grantor and the requestor, and the interconnect network uses a second physical link different than the first physical link between the grantor and the requestor.

9. The computer program product of claim 8, wherein determining the number of transfers to the grantor further comprises determining the number of pending transfers in a pending queue of the requestor.

10. The computer program product of claim 8, wherein determining the number of transfers to the grantor further comprises determining a number of instructions targeting the grantor by a load-store unit.

11. The computer program product of claim 8, wherein requesting control of the grantor based on the event further comprises requesting control of the grantor based on one or more of: a number of delayed transfers to the grantor meeting a second threshold, a number of clock cycles a delayed transfer has been delayed meeting a third threshold, a number of clock cycles the bypass path has been idle meeting a fourth threshold, and an indication that the requestor has completed communications to the grantor.

12. The computer program product of claim 8, wherein communicating the transfers via the bypass path to the grantor further comprises communicating the transfers via the bypass path without causing a mux select to be switched.

13. The computer program product of claim 8, wherein the memory vault and processing element are positioned directly on top of each other on a module.

* * * * *